Dec. 5, 1939.   J. A. HOFFMAN   2,182,230
FIELD INSECT DESTROYER
Filed Sept. 27, 1939
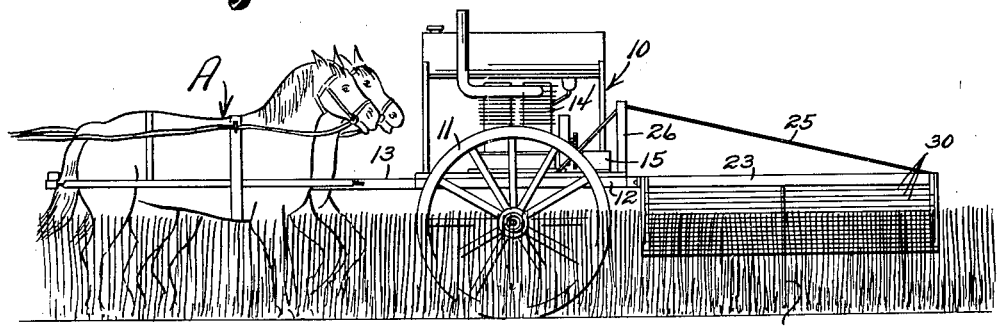
Fig. 1.
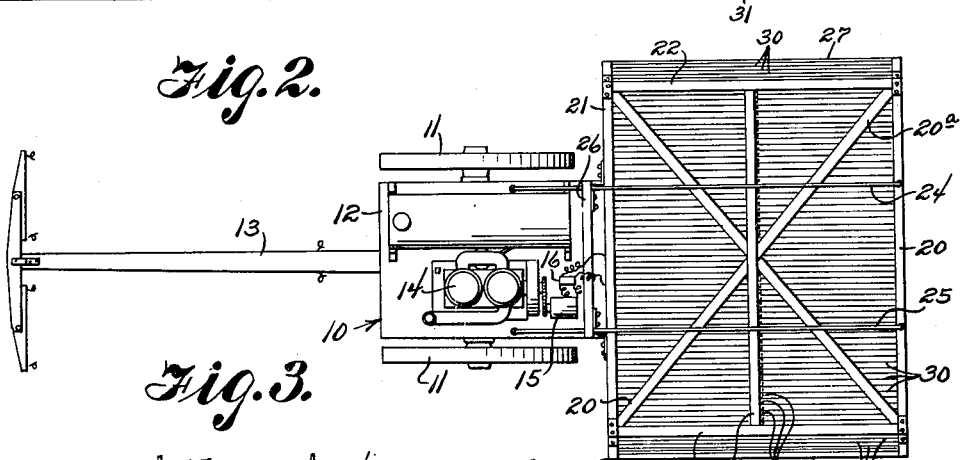
Fig. 2.
Fig. 3.
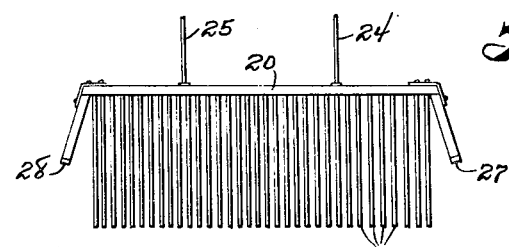
Fig. 4.
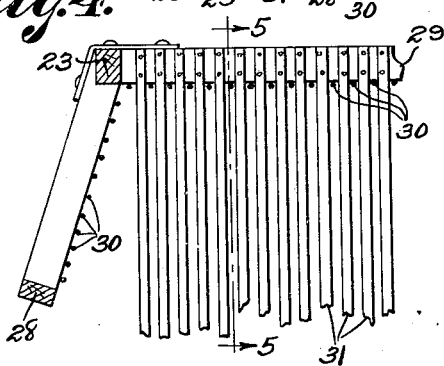
Fig. 5.
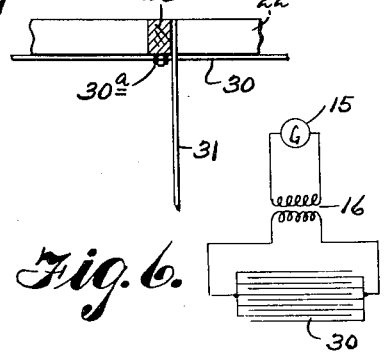
Fig. 6.
John A. Hoffman
INVENTOR
BY Victor J. Evans & Co.
ATTORNEYS Patented Dec. 5, 1939

2,182,230

UNITED STATES PATENT OFFICE 2,182,230

FIELD INSECT DESTROYER

John A. Hoffman, Bismarck, N. Dak.

Application September 27, 1939, Serial No. 296,862

3 Claims. (Cl. 43—132)

This invention relates to devices for destroying flying insects such as grasshoppers and the like in grain fields.

It is an object of the present invention to provide a machine useful in the destruction of grasshoppers and similar flying and jumping insects and pests, particularly when the same are located in grain fields under circumstances such that it is impractical to destroy the insects or pests by devastation of the country side with fire or other commonly used means of pest control.

Another object of the present invention is to provide a means for destroying and controlling insects and pests which is both most effective in operation and also economical and which does not materially affect a growing crop during use.

An advantage of the novel pest control device according to this invention over other devices now in use is that the insects and pests are destroyed by inoffensive means including burning and electrocution whereby the terrain is not polluted with noisome, obnoxious, poisonous or offensive chemical substances. In some instances it has been observed that the destroyed insects and pests have appreciable value as fertilizer.

Another advantage of the insect and pest control device according to this invention over other similar devices is that the destroyed pests do not lodge in the device, but instead fall therefrom after destruction back into the field from whence they came.

A noteworthy feature of the present invention is its rugged structural simplicity which not only assures long useful life but permits manufacture of the device by unskilled labor such as commonly is found on farms.

Other objects, advantages and features of the new and improved field insect destroyer according to the present invention will be apparent to those skilled in this art during the course of the following description.

Regarded in certain of its broader aspects the novel insect and pest control device according to the present invention comprises a frame supported for movement over a field wherein the pests and insects are located, said frame carrying an electrically charged grid from which hang flaps for physically disturbing insects located on the surface traversed causing said insects and other pests to arise against the charged grid, thereby effectuating their destruction by means including electrocution and burning.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing,

Figure 1 is substantially a side elevational view of the presently preferred embodiment of the instant invention showing same as if in use;

Fig. 2 is substantially a top plan view of the device proper illustrated in Fig. 1;

Fig. 3 is essentially a front elevational view of the frame carrying the charged grid and insect disturbing means;

Fig. 4 is substantially a fragmentary vertical sectional view of one end of the device illustrated in Fig. 3;

Fig. 5 is substantially a vertical sectional view of Fig. 4 taken along the line 5—5 thereof; and Fig. 6 is essentially a schematic circuit diagram illustrating connection between parts of the device.

Referring now to the figures of the drawing, it will be noted that the device generally designated by the numeral 10 comprises a pair of wheels 11 supporting a carriage 12 which, in use of the device, is moved by horses A connected by a conventional means to draw posts 13. It is to be understood of course at this juncture that the present invention is not limited in its physical embodiments to structures which are drawn by horses but instead other means of locomotion may be provided, for instance other farm animals such as asses and oxen, or a tractor may be connected with the device by appropriate coupling means.

A gas engine or equivalent prime mover 14 is mounted upon the carriage 12 and drives a generator 15, the output of which is fed to a suitable high frequency converter such as a conventional spark coil 16.

A frame comprising cross pieces 20 and 21 held in spaced relation by connector bars 22 and 23 and braced by struts 20a is mounted on front parts of the carriage 12 by suitable brackets and is held in substantially horizontal position by the supporting cables 24 and 25 passing over the standards 26 and connected to the carriage 12 hereinabove described. The sides of the frame extend downwardly terminating in connector bars 27 and 28 substantially as shown in Figs. 3 and 4.

A grid formed of spaced substantially parallel electrically isolated wires 30 is mounted on the under side of the frame and downwardly extending edge portions thereof, it being understood that alternate wires are connected to a common terminal on the output side of the spark coil 16 whereby the grid is charged with high frequency current of a quality such as to destroy or to render innocuous insects and pests coming in contact therewith. It is of course to be understood as will be perceived from a consideration of Fig. 5 that the wires forming the charged grid are insulated from the frame by appropriate insulators 30a.

A cross piece 29 mounted at its ends on midportions of the connector bars 22 and 23 carries a series of downwardly dependent insect and pest disturbing members 31 which extend below the frame to an extent such as to assure contact of the ends thereof with the surface traversed by the device causing insects and pests thereon to be disturbed and to rise upwardly against the grid 30, thereby effectuating their own destruction. In the presently preferred embodiment of this invention, the insect disturbing means 31 comprises straps of leather.

In operation of the device the charged grid supported upon the frame is moved over the surface where the insects and pests are located and, as the downwardly dependent straps 31 arouse the insects and pests, they jump or fly upwardly, thereby coming in contact with the charged grid 30, causing themselves to be destroyed or at least rendered innocuous by means including electrocution and burning.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A device useful for destroying flying insects in fields comprising a moving substantially horizontal frame, a charged grid on under parts of said frame, and downwardly dependent insect disturbing means mounted on under parts of said grid near the center thereof.

2. A device for destroying flying and jumping insects in fields comprising a moving carriage; a generator of high frequency current mounted on said carriage; a horizontally extending frame mounted on said carriage; an electrically conductive grid charged by said generator mounted on under parts of said frame; and a transversely extending series of downwardly dependent flaps mounted beneath said frame for disturbing insects on the surface traversed by the carriage causing said insects to arise therefrom and strike the charged grid.

3. A device useful for destroying flying insects in fields comprising a moving carriage; a generator of high frequency current mounted on said carriage; a substantially rectangular horizontal frame mounted on front parts of said carriage, said frame having downwardly inclined edge portions extending therefrom; an electrically conductive network charged by said generator, mounted on under parts of said frame and the edge portions thereof; and a transversely extending series of downwardly dependent flaps mounted beneath said frame and edge portions thereof for disturbing insects on the surface transversed by the carriage causing said insects to arise therefrom and strike the charged network.

JOHN A. HOFFMAN.